United States Patent Office 2,795,524
Patented June 11, 1957

2,795,524

PROCESS OF PREPARING A COMPACTED NON-WOVEN FIBROUS WEB EMBEDDED IN A COPOLYMER OF BUTADIENE AND ACRYLONITRILE AND PRODUCT

Ernest A. Rodman, Newburgh, N. Y., assignor to E. I. du Pont de Nemours and Company, Wilmington, Del., a corporation of Delaware No Drawing. Application November 2, 1954,
Serial No. 466,455

12 Claims. (Cl. 154—137)

This invention relates to the production of reinforced plastic sheet materials which are adapted for use where high tear strength and toughness are desired.

Textile sheet materials prepared from natural or synthetic fibers by weaving, felting, knitting, etc., have certain inherent desirable properties, such as high tensile strength. Inherent disadvantages of such textile materials for certain applications include, among others, low tear strength, porosity, uneven surface and lack of uniform extensibility in all directions.

Another class of sheet materials is the homogeneous film type of sheet materials which are non-porous and impervious to certain gases and liquids, have a smooth surface and are extensible in all directions. The film type of sheet materials are inherently weaker in tensile and tear strengths as compared to the textile sheet of an equal weight basis.

It has long been desired to combine the high tensile strength of textile sheet materials with the extensibility of film materials and to this end various combinations have been proposed. Various fibers have been combined in a variety of ways to accomplish this desideratum. A variety of surface coatings have been applied to textile sheet materials and preformed films have been laminated to the surface of woven and non-woven fabrics. Textile fibers have been mixed with film forming compositions, then the mass formed into a sheet. None of these combinations has produced a product having the extensibility of film materials combined with the strength properties of woven textile materials.

The reinforced plastic sheets of this invention represent a new class of materials. They combine the chemical resistance, pliability and extensibility of a continuous plastic film with the high strength properties of woven heavy duty fabrics. The pliable sheet materials of this invention are characterized by high strength at low weight. Unlike woven fabrics, these materials have uniform strength and extensibility in all directions. At equal weight, certain combinations have four to seven times the tear strength of strong fabrics, such as cotton duck and canvas, and their tensile strength is also high.

An object of this invention is the production of reinforced plastic sheets which have greatly improved physical properties. A still further object is the provision of a sheet material having a smooth film-like surface combined with high tear and tensile strength and extensibility in all directions.

These objects are accomplished according to the present invention by forming a non-woven mat or web of polymeric synthetic fibers and binding them together with a copolymer of butadiene and acrylonitrile containing compositions. The polymeric synthetic fibers useful in carrying out this invention include nylon, polyacrylonitrile, polyethylene terephthalate and mixtures thereof.

The nylon fibers for carrying out this invention are those prepared from synthetic linear super polymers which are obtainable from bifunctional reactants as described in U. S. Patents 2,071,253 and 2,130,948. These polymers are capable of being formed by extrusion from hot melts into filaments which, upon cold drawing, show molecular orientation along the fiber axis.

The polyacrylonitrile fibers may be prepared in accordance with the teaching set forth in U. S. Patents 2,404,714 to 2,404,727 inclusive.

The polyethylene terephthalate fibers may be prepared in accordance with the procedure described in U. S. Patent 2,465,319.

Throughout the specification and claims the term "polymeric synthetic fiber" means fibers of nylon, polyacrylonitrile or polyethylene terephthalate or mixtures thereof.

The term "copolymer of butadiene and acrylonitrile" as used throughout the specification and appended claims embraces the material of the type disclosed in U. S. Patent 1,973,000 and compositions which contain the copolymer as an essential ingredient.

The terms "web," "mat" and "bat" are used synonymously throughout the specification and appended claims to define a sheet of unwoven interlaced or felted fibers.

The high tear strength of the sheet material produced in accordance with this invention depends to a large extent on the degree of affinity between the polymeric synthetic fiber and the copolymer of butadiene and acrylonitrile. The polymeric synthetic fibers are employed for their high tenacity. The copolymer of butadiene and acrylonitrile is employed for its critical degree of adhesion to the polymeric synthetic fibers. When other binders are employed, widely varying results are obtained. When the degree of adhesion between the binder and fiber is too great the fibers are cemented together in such a manner that they may be broken one at a time when a stress is applied, which results in low tear strength. If the degree of adhesion is too low, a unitary composite structure is not obtained and the tear resistance is reduced. The degree of adhesion between the nylon, polyacrylonitrile or polyethylene terephthalate fibers and copolymer of butadiene and acrylonitrile results in a reinforced plastic sheet material with a tear strength much greater than that obtained with binder materials which have a greater affinity to the polymeric synthetic fibers.

The following examples are illustrative of the invention. Throughout the specification and appended claims the parts and percentage figures are expressed on a weight basis unless stated otherwise.

*Example I*

A preformed unsupported film 25 mils thick and weighing 20 ounces per square yard was prepared from the following composition:

| | Parts by weight |
|---|---|
| "Hycar OR–25" (copolymer of 65 parts butadiene and 35 parts acrylonitrile by weight) | 150.00 |
| Carbon black | 84.00 |
| Zinc oxide | 7.50 |
| Stearic acid | 1.50 |
| "Neozone" D (phenyl beta naphthylamine) | 1.50 |
| Calcium carbonate | 30.00 |
| Sulfur | 2.25 |
| MBTS (benzothiazyl disulfide) | 2.25 |
| Di(butoxy ethyl) sebacate | 60.00 |
| | 339.00 |

The above composition was milled together on a two-roll rubber mill and then calendered in the form of an unsupported film. The preformed film was superposed over a non-woven nylon mat, weighing 8.0 ounces per square yard, which was formed from 1½ inch, 3.0 denier nylon staple on an apparatus such as disclosed in U. S. Patent 2,451,915, issued October 19, 1948, to F. M. Buresh. The assembly was subjected to heat and pressure (30 minutes at 307° F. and 650 p. s. i.) to cure, condense and form an integral sheet in which the nylon fibers were embedded in the film.

The laminated sheet had a film-like appearance on one side and a slightly fuzzy surface on the opposite side. The laminated product had a trapezoid tear of 45 pounds in the machine direction and 45 pounds in the cross-machine direction. (Trapezoid tear test is described in Federal Specification CCC-T-191a dated October 5, 1945.) The laminated sheet was equally extensible in all directions. The nylon mat prior to lamination did not have sufficient tensile strength to support its own weight. The unsupported film prior to lamination had a trapezoid tear of 4 pounds in both directions.

*Example II*

A loosely bound non-woven mat of nylon fibers 3.0 denier, 1.5" staple weighing 2.0 ounces per square yard, produced on a Buresh machine (U. S. Patent 2,451,915), and not having sufficient tensile strength to support its own weight, was uniformly dusted on one side with dry powdered "Hycar OR–15" (copolymer of 55 parts of butadiene and 45 parts of acrylonitrile by weight) in an amount corresponding to .9 ounce per square yard. A second 2 ounce nylon web was superposed over the dusted surface. The assembly was subjected to a pressure of approximately 650 p. s. i. at 350° F. for a period of three minutes. The nylon mats were thoroughly impregnated, soft, flexible, permeable to air and had a feel much like chamois skin. The tongue tear strength, as determined by ASTM Test Method D39–49, was 8 pounds in both directions. The laminated sheet had a total weight of 4.9 ounces per square yard and contained 81.7% nylon fiber and 18.3% binder.

*Example III*

A composite mat was built up of six carded webs of 1½", 3.0 denier nylon staple. Each web, weighing approximately 1.25 ounces per square yard, was dusted with dry powdered "Hycar" (same as Example II) before being assembled in the composite. The assembly was pressed at 350° F. for three minutes at approximately 650 p. s. i.

The pressed material was flexible, had a good "hand" and a tongue tear of 23 pounds in both directions.

*Example IV*

A non-woven fabric was prepared by forming a web of nylon staple 1½ inch, 3.0 denier. Five separate portions of the web, each weighing approximately 1.1 ounces per square yard, were dusted with dry powdered "Hycar OR–15" (same as Example II). The five separate webs were then superposed in crosslapped relation and subsequently condensed by passing between heated (310° F.) calender rolls. The condensed product containing 31.4% "Hycar" and 68.6% nylon was soft and flexible. It weighed 8.22 ounces per square yard, had a tensile strength of 14 pounds in one direction and 12 pounds in the opposite direction.

A portion of the condensed mat was dipped in toluol and, after drying, the tongue tear strength was increased to 16 pounds in each direction.

*Example V*

A porous paper-like structure was prepared by impregnating a waterleaf of polyethylene terephthalate fibers with a copolymer of butadiene and acrylonitrile. Polyethylene terephthalate fibers ⅛ inch in length, .1 denier per filament, were formed into a waterleaf by making a slurry of the fibers in water and then formed into sheets weighing about 2.0 ounces per square yard by the well known paper making technique. The waterleaf was dried and then dipped into a 10% solution of "Hycar OR–25" dissolved in methyl ethyl ketone. The excess solution was allowed to drain from the waterleaf and then the impregnated sheet was dipped in ethyl alcohol to coagulate the "Hycar" binder throughout the fibrous sheet after which it was thoroughly dried. Finally the sheet or web was preheated to 300° F. and then cold pressed under platen pressure of about 1500 p. s. i.

The product was an extremely tough paper-like sheet material highly resistant to tear. The ratio of fiber to binder was about 70/30.

*Example VI*

A six ounce web of 3 denier, 1½" polyacrylonitrile staple is formed on a Buresh web forming apparatus. The non-woven web is needle punched two or more times in accordance with the apparatus described in the copending H. G. Lauterbach application Serial No. 312,067, filed September 29, 1952. The web is then dipped into an aqueous latex containing about 50% of a copolymer of 55 parts butadiene and 45 parts of acrylonitrile. The excess latex is allowed to drain from the web and then it is dried at 250° F. The web may be further consolidated by applying heat and pressure after drying. The product was a leather-like sheet highly resistant to tearing.

*Example VII*

A needle punched non-woven web, same as employed in Example VI, is dipped in the following solution:

| | Parts by weight |
|---|---|
| Milled "Hycar OR–25" | 5.0 |
| "Durez" 12687 (phenol-formaldehyde resin) | 5.0 |
| Methyl ethyl ketone | 90.0 |
| | 100.0 |

While the web is wet with the impregnant it is dipped in ethyl alcohol and then in water to coagulate the impregnant throughout the web. The web is passed through pressure rolls to remove excess liquid and then dried at 250° F. The mat may be further consolidated by applying heat and pressure. The product was a leather-like sheet material highly resistant to tearing.

*Example VIII*

A non-woven mat of polyacrylonitrile fibers, 3.0 denier, 1.5" staple, weighing about 6.0 ounces per square yard was formed on a web making apparatus. An assembly of superposed alternating webs and a preformed film of "Hycar" (same as in Example I) was prepared in accordance with the following arrangement:

First layer—Polyacrylonitrile web
Second layer—"Hycar" film
Third layer—Polyacrylonitrile web
Fourth layer—"Hycar" film The assembly was subjected to heat and pressure (30 minutes at 307° F. and 1000 p. s. i.) to cure and consolidate the assembly into an integral sheet. The final product had a smooth film-like appearance on one side and a fuzzy fibrous appearance on the other side. It was tough and highly resistant to tear.

The copolymers of butadiene and acrylonitrile useful in practicing this invention contain about 85% to 40% butadiene and about 15% to 60% acrylonitrile, by weight. Proprietary products of this type include "Hycar" Buna-N, Paracril and Chemigum.

In the preferred examples the loosely bound fibrous mat from the card or other web-forming apparatus is placed in contact with the copolymer of butadiene and acrylonitrile prior to the application of the heat and pressure treatment.

In order to facilitate the handling of the nylon mat it may be precondensed before contacting it with the binder by passing it between pressure rolls or plates which compacts and increases the strength of the mat. Alternately, or in addition to the pressure treatment, the mat may be needle punched in accordance with the disclosure in copending application S. N. 312,067, filed September 29, 1952, by H. G. Lauterbach. The compacted mat is then placed in contact with the binder and the assembly subjected to heat and pressure. The preferred embodiments of this invention involve the simultaneous pressing and heating of the binder and polymeric synthetic fibers.

An alternate method is to introduce the binder throughout the non-woven fibrous mat in the form of an aqueous suspension or latex which may be fused after drying by subjecting the impregnated mat to heat and pressure and/or a solvent for the polymer.

The fibrous mats and copolymer of butadiene and acrylonitrile may be subjected to heat and pressure by passing between heated calender rolls under pressure or pressed between heated plates. The heat required must be sufficient to render the binder adhesive and have no appreciable deleterious effect on the structural fibers.

For the purpose of this invention it is important that the polymeric synthetic fibers not fuse or melt at the temperature which develops the adhesiveness of the copolymer of butadiene and acrylonitrile. The fiber must not lose its identity as a fiber during the processing. Nylon fiber is preferred in view of its relatively high melting point (approximately 482° F.) and high tensile and tear strengths. The wide difference in temperature at which the fibers melt (nylon 482° F. and polyethylene terephthalate 480° F.) and the tempertaures at which the copolymer of butadiene and acrylonitrile develop adhesiveness (300° F. to 350° F.) provides a safe operating range for the practice of this invention. The polyacrylonitrile fibers do not have a true melting point since the polymer decomposes before it melts. However, they are sufficiently resistant to decomposition at 400° F. to be useful in practicing this invention.

While the specific examples do not show mixtures of nylon, polyacrylonitrile and polyethylene terephthalate it is to be understood that it is within the scope of this invention to use mixtures of any two or all three of the fibers in forming the non-woven webs to be impregnated with the copolymer of butadiene and acrylonitrile.

It is also possible to improve the adhesiveness of the binder by treating the fibrous mat of polymeric synthetic fibers, just prior to applying the heat and pressure, with a volatile liquid which has a solvent action on the copolymer of butadiene and acrylonitrile and not the fibers.

Conventional non-woven fabrics and papers tear relatively easily when a strip is cut on one edge and the cut edges are subjected to opposing forces since the fibers are broken one at a time as the entire stress is applied to a relatively few fibers. When the reinforced plastic sheets of this invention are cut on one edge and the cut edges are subjected to opposing forces the binder and polymeric synthetic fibers stretch and the stress is distributed over a greater area than in the case of conventional sheet materials.

The ratio of the copolymer of butadiene and acrylonitrile binder to structural polymeric fiber may vary over a rather wide range. Useful products can be made in which the fiber represents 25% to 85% and the binder represents 15% to 75% of the combined weight of the fiber and binder.

The time, temperature and pressure used in the specific examples may vary. Within limits, the higher the temperature the less pressure is required; vice versa, lower temperatures require higher pressure.

The reinforced plastic sheets of this invention may be employed as substrates for surface coatings.

The sheets of this invention may be enhanced by decorations such as printing designs on the surface, embossing and various color effects by employing different colors for the polymeric fibers and binder.

The sheets produced in accordance with the invention can be dyed by application of the dye to the fibers before or after the fibers are carded into the form of a mat. Also the copolymer of butadiene and acrylonitrile may be colored by pigments and dyes before combining with the nylon fibers.

The denier of the filaments which may be used in carrying out this invention may vary depending on the type and appearance of the sheet material desired. While the 3 to .1 denier filaments are preferred, filaments having a denier of less than .1 may be used. Fibers having a denier of 50 to 70 produce useful sheets in accordance with this invention. The fiber may be straight or crimped.

The preferred fiber length is about 1½ to ⅛ inches. The type of apparatus employed in forming the bat will control the fiber length more or less. Fiber lengths as short as ⅛ inch and as high as 3 inches or longer may be used in practicing this invention.

The sheet material of this invention, depending upon the ratio of polymeric fiber to binder and upon the conditions of pressing and heating employed, possess a wide range of properties which adapt the product for the different purposes for which continuous sheets are now used.

The sheet materials of this invention can be made in a range of weights and thicknesses and their properties have suggested use in such applications as: luggage, cases, mail sacks, protective clothing, upholstery, bookbinding, replacement for canvas, tarpaulins and waterproofed ducks, power transmission belting, conveyor belts, electrical insulation, heavy duty packaging, gun covers, airplane wing covers and other aircraft uses where a high strength lightweight flexible sheet material is indicated, extra gasoline tanks for planes; covers for porch furniture, boats, canoes and exposed equipment on shipboard; high strength adhesive tapes, heavy duty raincoats, mothproof bags, army tents, sleeping bag covers, golf bags, paper currency, diaphragms, gaskets, leather replacement, basketball and football covers, shoe construction materials and shoe linings.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

I claim:

1. A reinforced plastic sheet material comprising a compacted non-woven web composed predominantly of polymeric synthetic fibers selected from the class consisting of nylon, polyacrylonitrile, polyethylene terephthalate and mixtures thereof, embedded in a composition comprising a copolymer of butadiene and acrylonitrile.

2. A plastic sheet material composed predominantly of nylon fibers in the form of a compacted non-woven web embedded in a composition comprising a copolymer of butadiene and acrylonitrile.

3. A plastic sheet material composed predominantly of polyacrylonitrile fibers in the form of a compacted non-woven web embedded in a composition comprising a copolymer of butadiene and acrylonitrile.

4. A plastic sheet material composed predominantly of polyethylene terephthalate fibers in the form of compacted non-woven web embedded in a composition comprising a copolymer of butadiene and acrylonitrile.

5. A product of claim 1 in which the fibers represent 25% to 85% of the combined weight of the fibers and the copolymer.

6. A plastic sheet material composed predominantly of a web of compacted non-woven polymeric synthetic fibers selected from the class consisting of nylon, polyacrylonitrile, polyethylene terephthalate and mixtures thereof, embedded in a composition comprising copolymer of butadiene and acrylonitrile, said copolymer comprising about 85% to 40% butadiene and about 15% to 60% acrylonitrile by weight.

7. Process of preparing plastic sheet material which comprises forming a web of non-woven staple fibers selected from the group consisting of nylon, polyacrylonitrile, polyethylene terephthalate and mixtures thereof, placing a composition comprising a copolymer of butadiene and acrylonitrile in contact with said web and subjecting the assembly to sufficient heat and pressure to compact the web, cause the copolymer to fuse and permeate the web.

8. The process of claim 7 in which the copolymer is in the form of a preformed film when brought in contact with the non-woven web.

9. The process of claim 7 in which the copolymer is in particulate form when brought in contact with the non-woven web.

10. The process of claim 7 in which the copolymer is dispersed in an aqueous medium when brought in contact with the non-woven web.

11. The process of claim 7 in which the fibers represent 25% to 85% of the combined weight of fibers and binder.

12. The process of claim 7 in which the copolymer is dispersed in an organic solvent when brought in contact with the non-woven web.

References Cited in the file of this patent

UNITED STATES PATENTS

| | | |
|---|---|---|
| 2,402,021 | Compton | June 11, 1946 |
| 2,439,202 | Daly | Apr. 6, 1948 |
| 2,482,236 | Berglund | Sept. 20, 1949 |
| 2,530,441 | Reinhardt et al. | Nov. 21, 1950 |
| 2,676,128 | Piccard | Apr. 20, 1954 |
| 2,689,199 | Pesce | Sept. 14, 1954 |
| 2,719,795 | Nottebohm | Oct. 4, 1955 |
| 2,719,802 | Nottebohm | Oct. 4, 1955 |

FOREIGN PATENTS

| | | |
|---|---|---|
| 621,867 | Great Britain | Apr. 21, 1949 |